July 24, 1956    A. J. PETZINGER    2,756,391

VOLTAGE-RESPONSIVE ELECTRICAL MEASURING INSTRUMENTS

Filed Sept. 11, 1951

WITNESSES:
Robert C. Baird
Mw. W. Groome

INVENTOR
Ambrose J. Petzinger.
BY C. L. Freedman
ATTORNEY

United States Patent Office 2,756,391
Patented July 24, 1956

2,756,391

VOLTAGE-RESPONSIVE ELECTRICAL MEASURING INSTRUMENTS

Ambrose J. Petzinger, Fair Lawn, N. J., assignor to Westinghouse Electric Corporation, East Pittsburgh, Pa., a corporation of Pennsylvania Application September 11, 1951, Serial No. 246,133

2 Claims. (Cl. 324—104)

This invention relates to voltage-responsive electrical instruments, and it has particular relation to electrically-heated thermo-responsive measuring instruments having variable heating resistances.

In many conventional electrical instruments the input impedance or resistance of the instrument varies under conditions which the instrument must expect to encounter in normal operation. Such an instrument may be employed for various functions. For example, the instrument may be an electrical relay, an indicating measuring instrument, a recording measuring instrument, or an integrating measuring instrument. The invention is particularly suitable for electrically-energized thermo-responsive instruments and it will be discussed with particular reference to such an instrument.

If the input resistance of an electrical instrument varies under operating conditions, the response of the instrument to its energization may vary undesirably. For example, consider the case of a thermo-responsive instrument which is heated by the passage of electrical current through an input electrical resistance. As a specific example, the thermo-responsive instrument may be a voltmeter having multimetallic laminations made of materials having different temperature coefficients of expansion. In conventional instruments of this type, it has been found desirable from a practical standpoint to employ a heating resistance material which has a positive temperature coefficient of resistance. Because of the positive temperature coefficient of resistance, such an instrument has a sensitivity which decreases as the energization of the instrument increases. This variation is due to a number of factors. For example, as the voltage applied to the instrument increases, the self-heating of the instrument increases. The resulting increase in the resistance of the instrument input circuit prevents the input current from increasing linearly with the applied voltage.

Furthermore, conventional multimetallic springs have deflection constants which decrease with an increase in temperature of the spring. Thus, a given increment in the energization of a hot spring does not produce as great a change in deflection of the spring as the deflection produced by the same increment applied to a cold spring.

An added factor affecting sensitivity resides in the increase in heat loss of an instrument as the temperature of the instrument increases. Thus, self-heating of an instrument results in a material increase in heat radiation losses at higher energizations thereof. A given input energy increment produces a greater temperature increment at a low energization level than at a high energization level.

Because of the decreased sensitivity of a conventional instrument for higher energizations thereof, it has been the practice to employ springs having high deflection constants. While such springs provide adequate sensitivity at higher energizations of the instrument, they require higher energy inputs. Such high energy inputs not only result in undesirably increased heating of the instrument, but also increase the burden on the circuit energizing the instrument. Furthermore, the higher deflection constants required increase the tendency for turns of spiral springs to touch each other. Such touching may introduce errors in the reading of the instrument.

In accordance with the invention, an electrical instrument is energized through a voltage transducer. This voltage transducer has an output voltage which varies as a predetermined function of the input voltage as long as the resistance load represented by the electrical instrument remains constant. However, a variation in the resistance load is compensated by a predetermined variation in the output voltage of the voltage transducer.

In a preferred embodiment of the invention the voltage transducer comprises capacitive and inductive impedance units which are connected in series for energization. The electrical instrument to be energized is connected for energization in accordance with the voltage across one of the units. The capacitive and inductive impedance units have reactances which are substantially equal in magnitude. If desired, the sensitivity of the instrument may be controlled by employing an impedance unit which has an impedance magnitude dependent on the energization thereof. The capacitive and inductive impedance units then may be proportioned to provide equal magnitudes of reactance for an energization at which the instrument is to have a high sensitivity.

It is, therefore, an object of the invention to provide an improved electrical system for energizing a load impedance wherein the current supplied to the load impedance is controlled independently of the value of the load impedance.

It is a further object of the invention to provide an electrical system for energizing an electrical instrument with a current which is substantially independent of the impedance of the electrical instrument.

It is also an object of the invention to provide a voltage transducer for energizing an electrical instrument wherein the voltage transducer comprises inductive and capacitive impedance units proportioned to have substantially equal magnitudes of reactance within the operating range of the instrument.

It is a still further object of the invention to provide a voltage transducer as set forth in the preceding paragraph wherein the magnitude of the reactance of one of the impedance units varies as a function of the energization thereof.

Other objects of the invention will be apparent from the following description taken in conjunction with the accompanying drawing in which.

Figure 1:
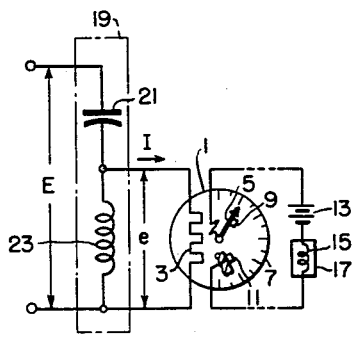
Figure 1 is a schematic view of an electrical instrument and a circuit for energizing the electrical instrument embodying the invention.

Referring to the drawing, Fig. 1 shows an electrical instrument 1, having input terminals connected for energization in accordance with a voltage $e$. It will be assumed that the instrument 1 is a thermo-responsive instrument wherein a heating resistance is represented by a resistor 3. It will be understood that numerous thermo-responsive mechanisms are available in the prior art. For example, thermocouples, multimetallic springs and Bourdon-tube springs filled with a liquid which expands with increases in temperature have been employed.

The instrument 1 has a pointer 5 which is moved with respect to a scale 7 in accordance with a function of the heat generated by the resistor 3. If desired, the pointer may carry a contact 9 which is movable with the pointer into engagement with a fixed contact 11 which is secured to the supporting structure of the instrument. It will be understood that the contacts normally are insulated from each other. Engagement of the contacts may be employed for any desired control operation. For example, such engagement of the contacts may connect a source of voltage represented by a battery 13 across the trip coil 15 of a circuit interrupter 17 to trip the circuit interrupter.

As previously pointed out, conventional thermoresponsive instruments have sensitivities which tend to decrease as the applied voltage $e$ increases. In order to compensate for such variation in sensitivity, the instrument 1 is energized through a voltage transducer 19 which has an input voltage E applied thereto. The output voltage $e$ of the transducer is applied to the instrument 1. The voltage E now becomes the quantity which the instrument 1 is to measure.

The voltage transducer 19 is designed to provide a voltage ratio $$\frac{E}{e}$$

which varies in a predetermined manner to compensate for the variation in sensitivity of the instrument 1. In a preferred embodiment of the invention, the transducer 19 provides a current input to the instrument 1 which is substantially independent of the magnitude of resistance of the resistor 3.

In the embodiment of the invention illustrated in Fig. 1, the transducer 19 includes a capacitive impedance unit 21 and an inductive impedance unit 23 which are connected in series for energization in accordance with the voltage E. It will be understood that the voltage E is an alternating voltage. This voltage may have any desired frequency, but it may be assumed for present purposes that the voltage has the usual power frequency of 60 cycles per second.

Let it be assumed that the capacitive impedance unit 21 is represented by a capacitor having a capacitance C, whereas the inductive impedance unit 23 is represented by an inductance coil having an inductance L. The magnitude of reactance of the capacitor 21 for an applied frequency $f$ then may be represented by the expression $X_C = 1/(2\pi f C)$. The magnitude of the reactance represented by the inductive impedance unit 23 may be represented by the expression $X_L = 2\pi f L$.

If the magnitudes of the reactances of the impedance units 21 and 23 are made substantially equal, it may be shown that the current I supplied to the resistor 3 may be represented by the equation:

$$I = \frac{kjE}{X}$$

In this equation $k$ is a constant and the expression $j$ represents the usual vector operator which indicates that the associated quantity E is rotated 90° from a reference vector. The reactance $X = X_C = X_L$.

By inspection of the foregoing equation, it will be noted that the current I is independent of the magnitude of resistance of the resistor 3. Furthermore, as long as the reactances of the impedance units 21 and 23 remain constant, the current I is directly proportional in magnitude to the voltage E.

If the resistor 3 has the customary positive temperature coefficient of resistance, the resistance thereof increases as the voltage E increases. However, since the current I remains directly proportional to the voltage E, the effect of the increase in resistance of the resistor 3 is to increase the heat generated by the resistor 3. Such increase materially compensates for the tendency of the instrument 1 to provide a sensitivity which decreases with an increase in energization.

From the foregoing discussion, it is clear that the voltage transducer 19 not only compensates for the tendency of the positive temperature coefficient of the resistor 3 to decrease the sensitivity of the instrument at the higher energizations thereof, but it also compensates for the tendency of the deflection constants of temperature responsive elements, such as multimetallic springs, to decrease with an increase in temperature thereof.

The invention permits the utilization of thermoresponsive elements such as multimetallic springs having a basic deflection lower than the deflection previously employed. This reduces the tendency of turns of spiral springs to touch each other. Furthermore, a reduction in the energy loss of the thermo-responsive instrument is effected. The reduction in energy loss is desirable not only because of the consequent reduction in heating of the instrument, but also because of the decreased burden presented by the instrument to the energizing circuit therefor.

Capacitors of excellent stability and negligible coefficients of capacitance readily are available in the art. If the inductive impedance unit 23 is an air-core inductance coil, the inductive reactance thereof also is quite stable and has a negligible temperature coefficient of inductance.

Preferably, the inductive impedance unit 23 is an inductance coil having an iron core. If desired, the iron core may be selected to have a permeability which is essentially constant over the operating range of the instrument. However, by designing the inductive impedance unit 23 to have an inductive reactance which varies somewhat as a function of the applied voltage E, certain additional improvements may be effected.

It is well understood in the art that the permeability of conventional magnetic materials such as iron and iron alloys varies as a function of the magnetic flux carried by the magnetic material. Consequently, it is a simple matter to provide an inductive impedance unit 23 having a magnitude of inductive reactance which decreases as the applied voltage E increases. By suitably relating the impedance units 21 and 23, the variation in the inductive reactance of the unit 23 may be employed for controlling the sensitivity of the instrument 1 as a function of the applied voltage E.

For example, let it be assumed that the magnitudes of reactances of the impedance units 21 and 23 are selected to be equal in the upper portion of the operating range of the instrument 1. As the energization of the instrument decreases from the value at which the impedance units have substantially equal magnitudes of reactive impedance, the current I decreases at a rate greater than the rate which would be in effect had the impedance units remained substantially equal in reactive impedance. Consequently, the sensitivity of the instrument 1 is improved in the upper portion of its range of energization. In this way, the designer may obtain a more uniform scale or may expand any desired voltage of the scale as required. It will be understood that the reactive impedances of the two units 21 and 23 may be made substantially equal in magnitude for that energization of the instrument at which the scale is to be expanded.

The invention also is useful in controlling the "interval" of the instrument 1. If the instrument is employed as a maximum-demand meter, it is desirable that the pointer 5 lag behind a change in energization of the meter in accordance with a predetermined plan. It is conventional practice in the art to accept the time required for the pointer to reach 90% of the increment in reading required by an increment in energization of a meter as the "demand interval" of the meter.

In the embodiment of the invention illustrated in Fig. 1, the initial rate of response of the instrument to a change in energization thereof is substantially the same as that of the prior art instrument. However, the instrument energized through the voltage transducer 19 reaches a higher reading in response to an increase in the applied voltage E than the reading reached by the instrument 1 if energized directly by the voltage E and this corresponds to an increase in interval. For this reason, the invention may be employed for increasing the interval of the instrument 1.

Figure 2:
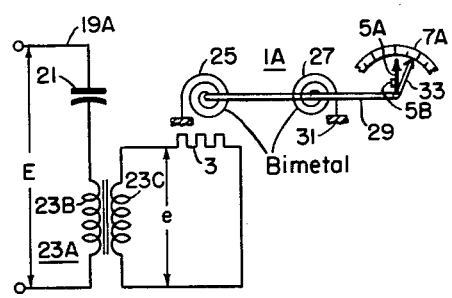
Fig. 2 is a schematic view of an electrical instrument and an energizing circuit for the electrical instrument embodying a modified form of the invention.

In Fig. 2 a thermo-responsive instrument 1A which corresponds to the instrument 1 of Fig. 1 is energized by the voltage E through a transducer 19A which corresponds to the voltage transducer 19 of Fig. 1. The voltage transducer 19A employs the capacitor 21. However, the inductive impedance unit of the voltage transducer 19A takes the form of a transformer 23A which has a primary winding 23B and a secondary winding 23C. The open-circuit reactance of the transformer 23A corresponds to the inductive reactance of the impedance unit 23 of Fig. 1. It will be understood that the open-circuit reactance of the transformer 23A is made equal to the capacitive reactance of the capacitor 21 in magnitude within the operating range of the associated instrument. The voltage transducer 19A of Fig. 2 otherwise operates in a manner similar to that of the voltage transducer 19 of Fig. 1.

Potential transformers conventionally encountered in the art have open-circuit reactances which decrease slightly with an increase in the applied voltage. This variation in open-circuit reactances of the transformer 23A may be employed to control the sensitivity of the associated instrument in the same manner by which the variation in inductive impedance of the unit 23 of Fig. 1 is employed to control the sensitivity of the instrument 1.

The instrument 1A of Fig. 2 is illustrated as including a pair of spiral multimetallic springs 25 and 27. These springs will be assumed for the present to be bimetallic springs constructed of two laminations of metal having different temperature coefficients of expansion. The springs are wound oppositely about a common shaft 29 and have their inner ends secured to the shaft. The outer ends of the springs are secured to a supporting structure 31.

The shaft 29 carries a pointer 5A which coacts with a scale 7A to indicate rotation of the shaft 29. The pointer 5A has a lip 5B positioned to engage a maximum-demand pointer 33. The maximum-demand pointer 33 is frictionally held in the highest position to which it is advanced by the lip 5B. The operation of maximum-demand pointers is well understood in the art.

It will be understood that the shaft 29 is rotated in accordance with the difference in temperatures of the springs 25 and 27. This means that if the springs are similar the instrument is substantially unaffected by ambient temperature. However, heat from the resistor 3 heats the spiral spring 25 alone and produces a difference in temperature for the purpose of operating the pointer 5A as a function of the applied voltage E.

Figure 3:
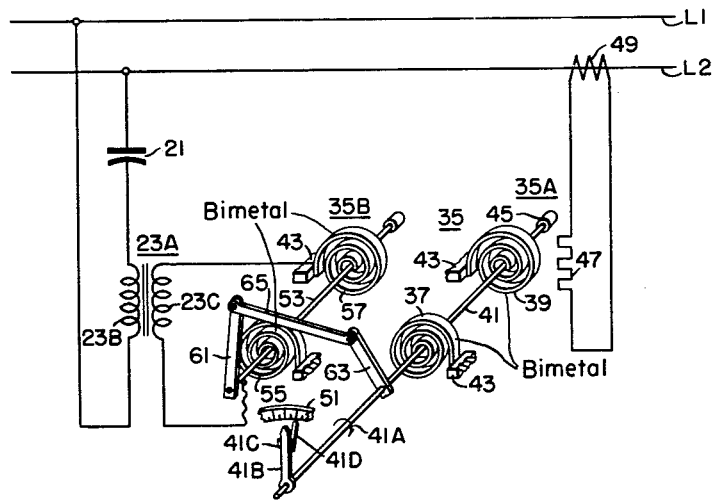
Fig. 3 is a schematic view, with parts in perspective, of an electrical instrument and an energizing circuit for the electrical instrument representing a still further modified form of the invention.

Referring to Fig. 3, it will be noted that a thermoresponsive measuring instrument 35 is energized from an alternating current circuit represented by conductors $L_1$ and $L_2$. This instrument is intended to measure a function of the volt-amperes flowing in the alternating current circuit.

The instrument 35 has a current-responsive section 35A and a voltage-responsive section 35B. The current-responsive section 35A includes two thermo-responsive elements which conveniently may be spiral bimetallic springs 37 and 39. These springs are wound in opposite directions about a shaft 41 and have their inner ends secured to the shaft. The outer ends of the springs are secured to a suitable supporting structure 43. The shaft 41 is mounted for rotation about its axis in any suitable manner as by bearing means 45 which may be secured to the supporting structure 43.

Since the springs 37 and 39 are differentially associated with the shaft 41, and since they may be similar in construction, the shaft is substantially unaffected by ambient temperature variations. The spring 39 is arranged to be heated in any suitable manner in accordance with current flowing through the conductor $L_2$. In the specific embodiment herein illustrated, the spring 39 is heated by a resistance heater 47 which is connected for energization from the secondary winding of a current transformer 49 associated with the conductor $L_2$. An increase in the temperature of the spring 39 results in rotation of the shaft 41 in the direction of the arrow 41A.

Rotation of the shaft 41A may be employed in various ways. In the specific embodiment of Fig. 3, a pointer 41B is secured to the shaft for rotation therewith. This pointer cooperates with a scale 51 which may be secured to the supporting structure 43. The pointer 41B has a lip 41C secured thereto. This lip is positioned to engage a maximum demand pointer 41D which is maintained frictionally in the highest position to which it is urged by the lip 41C.

The voltage-responsive section 35B is energized from the conductors $L_1$ and $L_2$ through the transformer 23A and the capacitor 21 which were described in the discussion of Fig. 2.

The voltage-responsive section 35B includes a shaft 53 which has associated therewith two thermo-responsive elements such as bimetallic spiral springs 55 and 57. These springs are differentially associated with the shaft 53 in the same manner by which the springs 37 and 39 are associated with the shaft 41.

The voltage-responsive section 35B is energized from the secondary winding of the transformer 23A which was described in the discussion of Fig. 2. Although one of the springs, such as the spring 57, may be heated from a separate heater, such as the heater 3 of Fig. 2, it will be noted in Fig. 3 that the spring 57 is directly heated by current supplied from the transformer 23A. To this end, the secondary winding 23C has one terminal connected to the outer end of the spring 57, whereas the remaining terminal of the secondary winding is connected through a flexible connection to the shaft 53. Consequently, current flows directly through the electroconductive spring 57 for the purpose of heating the spring.

As will be understood from the discussion of Fig. 2, the primary winding 23B of the transformer in Fig. 3 is connected in series with the capacitor 21 for energization in accordance with the voltage across the conductors $L_1$ and $L_2$.

Considering the current-responsive section 35A, the heat supplied to the spring 39 is proportional substantially to the square of the current flowing through the conductor $L_2$. Consequently, if the current-responsive section 35A were employed alone, the scale 51 could be calibrated to read directly the current flowing through the conductor $L_2$.

In order to obtain a measurement of a quantity which is a function of the volt-amperes flowing in the alternating-current circuit, the voltage-responsive section 35B is provided. This section has a response which is proportional substantially to the square of the voltage across the conductors $L_1$ and $L_2$.

The shafts 53 and 41 are coupled by suitable linkage for the purpose of modifying the rotation of the shaft 41 in accordance with a function of the voltage of the alternating-current circuit. In the embodiment of Fig. 3, the shafts 53 and 41 have secured to them respectively arms 61 and 63. The free ends of the arms are pivotally connected respectively to the ends of a link 65. By suitably correlating the torques of the two sections and the dimensions of the linkage, the rotation of the shaft 41 is modified to provide a measurement of volt-amperes flowing in the circuit represented by the conductors $L_1$ and $L_2$. Preferably, the proportions are such that when the current section 35A is deenergized, the link 65 is substantially in alignment with the arm 63. Fig. 3 shows proportions of the link and of the arms which have been found satisfactory in practice. An instrument of the type represented by the instrument 35 of Fig. 3 is set forth in my copending patent application Serial No. 186,948, filed September 27, 1950, and assigned to the same assignee.

In my aforesaid patent application, the spring 55 was approximately ½ as strong as the spring 57. For example, the springs could be identical except that the spring 55 would have approximately ½ the width of the spring 57. This relationship was provided because of the decrease in sensitivity of the spring 57 as the energization thereof increased.

In the present invention, the transformer 23A and the capacitor 21 compensate for the decrease in sensitivity of the spring 57 with increase in energization thereof. This compensation was discussed fully in connection with Figs. 1 and 2. Because of the provision of such compensation, it is possible to employ springs 55 and 57 which are identical in construction. The provision of similar springs 55 and 57 tends to eliminate the small errors which may be present with springs of unequal width due to ambient temperature variations.

Although the invention has been described with reference to certain specific embodiments thereof, numerous modifications falling within the spirit and scope of the invention are possible.

I claim as my invention:

1. In a system for energizing an electrical instrument in accordance with a variable alternating quantity having a predetermined frequency, an inductive-impedance unit designed for energization by an alternating electrical quantity of a predetermined frequency, a capacitive-impedance unit, one of the units having an impedance which varies as a function of the applied voltage, said impedance units having reactive impedances substantially equal in magnitude at a predetermined voltage of the predetermined frequency, circuit means connecting the impedance units in series, whereby the impedance units may be energized in series in accordance with a variable alternating electrical quantity to be measured, and an electrical measuring instrument comprising an element having a resistance which possesses a positive temperature coefficient of resistance, said electrical measuring instrument including translating means for indicating a range of values dependent on heat generated by current flowing through the element, and connections for energizing the element in accordance with the voltage across one of the units to compensate substantially for resistance variations due to self heating of said positive temperature coefficient resistance element, said variation in impedance of one of the units with the applied voltage varying the distribution of response of the measuring instrument to the variable alternating quantity within the operating range of the instrument.

2. In a system for energizing an electrically-energized, thermo-responsive instrument in accordance with a variable alternating quantity having a predetermined frequency, an inductive-impedance unit designed for energization by an alternating electrical quantity of a predetermined rated frequency, a capacitive-impedance unit, said impedance units having reactive impedances substantially equal in magnitude at said rated frequency, circuit means connecting the impedance units in series, whereby the impedance units may be energized in series in accordance with a variable alternating electrical quantity to be measured, and an electrical instrument comprising a supporting structure, an operated member, a pair of thermo-responsive multimetallic springs acting differentially in response to temperature changes to produce movement of said operated member relative to the supporting structure, electrical input connections for heating one of said springs, said input connections presenting a resistive input impedance subject to variation with energization thereof, said instrument having a relationship of response relative to input to the input connections which deviates from a predetermined relationship, and circuit means coupling the input connections for energization in accordance with the voltage across one of said impedance units, said impedance units having impedances proportioned to provide said desired relationship between the response of said instrument and the series input to said impedance units, one of the impedance units having a magnitude of reactive impedance which varies as a function of the voltage thereacross, said impedance units having magnitudes selected to be equal at a value of the magnitude of the alternating quantity applied thereto substantially above the minimum value of the alternating quantity for which the system is rated, the heated one of said springs having a response to heat which decreases as the temperature of the heated one of the springs increases, whereby the decrease in said response is compensated to a substantial extent by said variation in magnitude of the reactive impedance of one of the impedance units.

References Cited in the file of this patent

UNITED STATES PATENTS

| | | |
|---|---|---|
| 548,511 | Boucherot | Oct. 22, 1895 |
| 706,607 | Steinmetz | Aug. 12, 1902 |
| 1,831,640 | Roberts | Nov. 10, 1931 |
| 1,947,187 | Clark | Feb. 13, 1934 |
| 2,314,244 | Pratt | Mar. 16, 1943 |
| 2,444,027 | Becker | June 29, 1948 |
| 2,578,441 | Millar | Dec. 11, 1951 |

FOREIGN PATENTS

| | | |
|---|---|---|
| 101,354 | Australia | July 1, 1937 |
| 473,368 | Great Britain | Oct. 12, 1937 |